United States Patent [19]

Mölls et al.

[11] 4,318,848

[45] Mar. 9, 1982

[54] PROCESS FOR THE NEUTRALIZATION OF BASIC REACTION COMPOSITIONS

[75] Inventors: Hans-Heinz Mölls; Willy Schiwy, both of Leverkusen; Reinhold Hörnle, Cologne; Reinhard Nebeling, Leverkusen, all of Fed. Rep. of Germany

[73] Assignee: Bayer Aktiengesellschaft, Leverkusen, Fed. Rep. of Germany

[21] Appl. No.: 866,523

[22] Filed: Jan. 3, 1978

[30] Foreign Application Priority Data

Jan. 5, 1977 [DE] Fed. Rep. of Germany ...... 2700291

[51] Int. Cl.³ ................. C07C 105/00; C07C 107/04; C07C 107/06; C07C 107/08
[52] U.S. Cl. ........................................ 260/143; 8/544; 260/162; 260/163; 260/169; 260/203; 260/204; 260/208; 260/347.3; 260/348.19; 260/371; 260/376; 260/396 R; 260/453 P; 260/465 R; 260/684; 260/691; 544/339; 562/470; 564/271; 564/272; 568/333; 568/437; 568/608; 568/764; 585/25

[58] Field of Search .......... 260/208, 162, 163, 465 R, 260/203, 204, 376, 323, 143, 169, 371, 453 P, 347.3, 396 R; 8/89 R, 544; 568/608, 764, 437, 333; 544/339; 585/25; 564/271, 272; 562/470

[56] References Cited

U.S. PATENT DOCUMENTS

| | | | |
|---|---|---|---|
| 3,697,216 | 10/1972 | Hertel et al. | 8/46 |
| 3,781,169 | 12/1973 | Deubel et al. | 8/89 R |
| 3,993,439 | 11/1976 | Deubel et al. | 8/89 R |
| 4,042,320 | 8/1977 | Becker et al. | 8/85 R |

Primary Examiner—Floyd D. Higel
Attorney, Agent, or Firm—Sprung, Felfe, Horn, Lynch & Kramer

[57] ABSTRACT

Chemical reaction products, obtained in an alkaline medium and which require the addition of a dispersing agent, are neutralized by addition of a free surface-active acid to which, after its preparation, basic agents have not been added or have only been added up to a pH value of 3.

4 Claims, No Drawings

PROCESS FOR THE NEUTRALIZATION OF BASIC REACTION COMPOSITIONS

The invention relates to a process for the neutralisation of reaction products, obtained in an alkaline medium during synthesis, the industrial use of which requires the addition of dispersing agents.

Reaction compositions obtained in the alkaline state during a synthesis are usually neutralised with the aid of mineral acids or organic acids, the salts obtained during the neutralisation in most cases having to be separated off from the reaction products, since they impair the technological properties of the resulting products. This is associated with increased costs, because of the additional filtration step, and in addition leads to effluents with an increased salt load.

On the other hand, in many cases anionic surface-active agents are added, after the actual synthesis and isolation, in order to optimise the technological properties, for example to stabilise a dispersion or to improve the dispersibility of powders, for example in the case of disperse dyestuffs, water-soluble dyestuffs, plant protection formulations, optical brighteners or pharmaceuticals.

It has now been found that reaction products obtained in an alkaline medium can be converted into the technologically desired formulation, containing surface-active agents, which correspond to the required properties, when the neutralisation is carried out by adding a free surface-active acid to which, after its preparation, basic agents have not been added or have only been added up to a pH value of 3.

Processes carried out industrially in which the end product is produced by a reaction in an alkaline medium are, for example, the reaction of phenol with formaldehyde to give o-hydroxymethylphenol (Baekeland process), the preparation of indigo by the condensation of o-nitrobenzaldehyde with acetone in the presence of dilute sodium hydroxide solution (Bayer-Drewson indigo synthesis), the conversion of o-aroyloxyacetophenones into o-hydroxydiaroylmethanes (Baker-Venkataraman reaction), the preparation of benzilic acid from benzil in the presence of strong alkali (benzilic acid rearrangement), the preparation of hydroxyquinones from acylaminoacetophenones under alkaline conditions (Camps quinoline synthesis), the disproportionation of aldehydes in acids and alcohols of the same chain length under alkaline conditions (Cannizzaro reaction), the preparation of $\beta$-hydroxycarbonyl compounds from aldehydes and ketones in the presence of sodium hydroxide solution (aldol condensation), the preparation of unsaturated aldehydes or ketones by reacting aromatic aldehydes with aromatic or aliphatic aldehydes or ketones in an alkaline medium (Claisen-Schmidt condensation), the alkaline-catalysed addition of active methylene groups to activated unsaturated systems (Michael condensation), the preparation of benzofurane-2-carboxylic acids by the action of alkali on 3-halogeno-coumarins (Perkins' rearrangement), the formation of phenolaldehydes from phenol, chloroform and alkali (Reimer-Thiemann synthesis), the preparation of imines from aldehydes and primary amines in the presence of alkali (Schiff's reaction), acylation with acid chlorides in the presence of dilute alkali (Schotten-Baumann reaction), the reduction of carbonyl groups to methylene groups with hydrazine in an alkaline medium (Wolff-Kischner reduction), the coupling of diazonium salts, carried out in an alkaline medium, for the preparation of azo dyestuffs, the base-catalysed replacement by halogen by primary and secondary amines for the formation of secondary and tertiary amines, the alkaline reduction of aromatic nitro compounds and condensation of the products with aromatic amino compounds to give azo dyestuffs, the formation of glycidyl esters by the condensation of aldehydes or ketones with esters of halogen acids in an alkaline medium (Darzens-Claisen condensation), the base-catalysed rearrangement of halogenoketones to give acids and esters (Favorskii rearrangement), the preparation of biaryl compounds from aryldiazonium compounds (Gomberg-Bachmann-Hey reaction), the reaction of phenyl-glycerol-o-carboxylic acid with alkali in the melt with subsequent decarboxylation and oxidation to give indigo (Heumann's indigo synthesis), the rearrangement of amides by means of halogen and alkali with the formation of isocyanates (Hofmann rearrangement) and the preparation of aromatic nitriles by the basic hydrolysis of trichloromethylarylketimines.

The reactions mentioned represent examples, without claiming completeness.

Surface-active acids of those surface-active agents mentioned in K. Lindner "Tenside, Textilhilfsmittel, Waschrohstoffe" ("Surface-active Agents, Textile Auxiliaries and Detergent Bases"), Volume I, Stuttgart 1964, page 565–567 can be used.

Particularly suitable surface-active acids are condensation products of formaldehyde and aromatic sulphonic acids. Examples of such surface-active acids are the condensation products of naphthalenesulphonic acids and formaldehyde, of ditolyl ether-sulphonic acids and formaldehyde, of diphenylsulphonic acids and formaldehyde and of terphenylsulphonic acids and formaldehyde.

In addition, co-condensates of the abovementioned acids can be used. The condensation products of aromatic sulphonic acids and formaldehyde are prepared by reacting 0.5–1.5 moles of the aromatic compound, for example ditolyl ether, with 0.5–3.0 mols of sulphuric acid and subjecting the product to a condensation reaction with 0.4–2.0 mols of formaldehyde in accordance with customary processes.

EXAMPLE 1

27 g of dry Na acetate are introduced into a molten mixture of 67 g of KOH, 27 g of NaOH, 3 g of water and 1 g of sodium carbonate. 22 g of $\beta$-aminoanthraquinone are introduced at 180° C. in the course of 20 minutes.

A mixture of 3 g of NaNO$_3$, 2 g of KOH and 1 g of NaOH is then added under a N$_2$ atmosphere at 220° C. in the course of 1.5 hours. The temperature is maintained for a further 1 hour and the melt is then stirred into 1 l of water. The dyestuff formed is reduced, filtered off and then stirred again with dilute sodium hydroxide solution. The alkaline suspension is then neutralised with a 50% strength solution of the condensation product of ditolyl ether-sulphonic acid and formaldehyde, adjusted to the desired tinctorial strength, ground in a bead mill and spray-dried.

EXAMPLE 2

16.2 g of 2,5-dichloroaniline together with 50 g of the condensation product of naphthalenesulphonic acid and formaldehyde (50% strength) and 50 ml of water are stirred thoroughly. The suspension is cooled to about 0° C., about 50 g of ice also being added. 24 ml of a 30% strength sodium nitrite solution run into this suspension in the course of 1 hour. The mixture is subsequently further stirred for about 1 hour and excess nitrite is then removed by decomposing with amidosulphonic acid.

27.8 g of 2-hydroxy-3-naphthoic acid anilide are dissolved in 200 ml of a 40% strength sodium hydroxide solution at 90° C. The solution is added to 400 ml of water, initially introduced, of about 85° C. The solution of the diazotised amine is allowed to run in at this temperature, whilst stirring. The mixture is further stirred for about 30 minutes and then rendered neutral with a 50% strength aqueous solution of the condensation product of naphthalene-sulphonic acid and formaldehyde. The dyestuff suspension formed is adjusted to the desired tinctorial strength, ground in a bead mill and spray-dried. A product which can be easily dispersed in water is obtained.

EXAMPLE 3

18.7 g of 2-aminophenol-4-sulphonamide together with 50 g of a 50% strength aqueous solution of a condensation product of diphenylsulphonic acid and formaldehyde and 50 ml of water are stirred thoroughly and brought to a temperature of 0°–5° C. 24 ml of a 30% strength aqueous sodium nitrite solution are added to this suspension in the course of 1 hour. The mixture is subsequently further stirred for 1 hour and excess sodium nitrite is then decomposed with amidosulphonic acid.

24.4 g of 2-(2,5-dichlorophenyl)-3-methyl-5-pyrazolone are dissolved in 50 ml of a 40% strength sodium hydroxide solution and 100 ml of water are added. The solution of the diazotised amine runs into this solution in the course of half an hour. The mixture is subsequently further stirred for half an hour. The pH of the dyestuff suspension is then adjusted to about 10 and the suspension is heated to about 90°–95° C. A solution of 8.5 g of sodium bichromate and 20 g of glucose in 150 ml of water is allowed to run in at this temperature in the course of 1 hour. This temperature is maintained for about a further 1 hour and the pH is then adjusted to about 9 with a 50% strength aqueous solution of the condensation product of diphenylsulphonic acid and formaldehyde. The dyestuff suspension formed is spray-dried directly without isolating.

EXAMPLE 4

5 mols of bis-(p-hydroxyphenyl)-2,2-propane and 7 mols of epichlorohydrin are subjected to a condensation reaction in the pressure of 3.05 mols of NaOH for 70 minutes at a temperature increasing from 40° to 70° C. and for a further 75 minutes at a temperature maintained in the range from 90° to 104° C. After the reaction has ended, the mixture is neutralised with a condensation product of terphenylsulphonic acid and formaldehyde and spray-dried.

EXAMPLE 5

100 g of phenol, 135 g of 30% strength formaldehyde and 3 g of sodium hydroxide in a 36% strength solution are heated to the boil for 75 minutes, the reaction mixture is cooled to 50° C. and a further 5.25 g of sodium hydroxide are added before the cooling is completed. The resin is present in an aqueous-alkaline solution and is precipitated by neutralisation with about 20 g of the surface-active acid used in Example 4.

A fine aqueous resin suspension is formed.

EXAMPLE 6

20 g of diphthalimido-dianthraquinonyl are suspended in 200 ml of water, warmed to 40° C. 30 g of sodium hydroxide solution (20% strength) are added to this in the course of 30 minutes. The mixture is allowed to boil under reflux for 6 hours and then neutralised with the 50% aqueous surface-active acid solution according to Example 1. A product is obtained which is dried directly, without intermediate isolation, to give a powder.

EXAMPLE 7

10 g of 1-amino-4-bromoanthraquinone-2-sulphonic acid are boiled under reflux together with 470 ml of water, 6 g of sodium carbonate, 30 ml of aniline and 5 ml of 10% strength copper sulphate solution for 1 hour. The alkaline solution is neutralised with the 50% strength surface-active acid solution used in Example 2 and the dyestuff suspension formed is dried, without isolation, to give a powder.

EXAMPLE 8

468 g of 4,4'-dinitrostilbene-2,2'-disulphonic acid are stirred with water and the mixture is rendered slightly alkaline with sodium hydroxide solution. 440 ml of 40% strength sodium hydroxide solution are then added, 346 g of 4-aminoazobenzylsulphonic acid (Na salt) are introduced and the mixture is diluted with water to a total volume of 4.5 l and heated at 100° C. for 4 hours. The condensation mixture is pumped into 5 l of water and 39 g of sodium sulphide are added. The mixture is kept at 100° C. for a further one hour and neutralised with a 50% strength condensation product of diphenylsulphonic acid and formaldehyde and the solution is subjected to spray-drying.

We claim:

1. A method of neutralizing and dispersing a reaction product obtained in an alkaline reaction medium during synthesis and requiring dispersion in industrial use consisting essentially of adding a free surface-active acid comprising the condensation product of formaldehyde and an aromatic sulfonic acid to the alkaline reaction medium after the reaction is completed to both neutralize and disperse the reaction product.

2. The process of claim 1 wherein the aromatic sulfonic acid is a naphthalene sulfonic acid, a ditolylether sulfonic acid, a diphenyl sulfonic acid, or a terphenyl sulphonic acid.

3. The process of claim 1 wherein the reaction product is an azo dyestuff coupled in an alkaline medium.

4. The process of claim 1, wherein the surface-active acid is added as an aqueous solution having a pH no greater than 3.

* * * * *